(12) United States Patent
Liu et al.

(10) Patent No.: US 11,029,151 B2
(45) Date of Patent: Jun. 8, 2021

(54) TRAVERSE-TYPE MEASUREMENT METHOD FOR DUAL-SYSTEM BILATERAL-SURVEY COMPOSITE LEVEL

(71) Applicant: DALIAN SENBIOR SURVEYING INSTRUMENT TECHNOLOGY CO., LTD., Dalian (CN)

(72) Inventors: Yanchun Liu, Dalian (CN); Qiang Meng, Dalian (CN); Yao Liu, Dalian (CN)

(73) Assignee: DALIAN SENBIOR SURVEYING INSTRUMENT TECHNOLOGY CO., LTD., Dalian (CN)

( * ) Notice: Subject to any disclaimer, the term of this patent is extended or adjusted under 35 U.S.C. 154(b) by 306 days.

(21) Appl. No.: 16/312,290

(22) PCT Filed: Apr. 19, 2018

(86) PCT No.: PCT/CN2018/083633
§ 371 (c)(1),
(2) Date: Dec. 21, 2018

(87) PCT Pub. No.: WO2018/201907
PCT Pub. Date: Nov. 8, 2018

(65) Prior Publication Data
US 2019/0204077 A1    Jul. 4, 2019

(30) Foreign Application Priority Data
May 3, 2017   (CN) .......................... 201710304982.7

(51) Int. Cl.
*G01C 5/00*     (2006.01)
*G01C 9/00*     (2006.01)
(Continued)

(52) U.S. Cl.
CPC ................ *G01C 5/00* (2013.01); *G01B 11/00* (2013.01); *G01B 21/02* (2013.01); *G01C 9/00* (2013.01);
(Continued)

(58) Field of Classification Search
CPC ........ G01C 5/00; G01C 15/06; G01C 15/002; G01C 15/004; G01C 9/00; G01S 19/07; G01S 5/021; G01B 21/02; G01B 11/00
See application file for complete search history.

(56) References Cited

FOREIGN PATENT DOCUMENTS

CN           103115610 A   *   5/2013
CN           103759705 A   *   4/2014
(Continued)

*Primary Examiner* — Alexander Satanovsky
*Assistant Examiner* — Douglas Kay
(74) *Attorney, Agent, or Firm* — Li & Cai Intellectual Property Office

(57) ABSTRACT

A traverse-type measurement method for a dual-system bilateral-survey composite level (A, B) is an intelligent traverse-type measurement method for integrated three-level error control loop inspection with the dual-system bilateral survey compound level (A, B). Specifically, survey station single-instrument inspection, survey station dual-instrument cross-inspection, and multi-survey station dual-instrument cumulative cross-inspection are adopted, and the number of observations and distance between survey stations are adjusted, such that measurement error is dynamically controlled in real time, ensuring that height difference measurement of survey stations and of measurement sections meets a preset precision requirement regardless of location or time, avoiding the invalid measurements that frequently occur with traditional levels, and improving working efficiency and economic benefit of the composite level.

1 Claim, 4 Drawing Sheets

(51) Int. Cl.
*G01C 15/00* (2006.01)
*G01C 15/06* (2006.01)
*G01S 19/07* (2010.01)
*G01B 21/02* (2006.01)
*G01B 11/00* (2006.01)
*G01S 5/02* (2010.01)

(52) U.S. Cl.
CPC ............ *G01C 15/002* (2013.01); *G01C 15/06* (2013.01); *G01S 5/021* (2013.01); *G01S 19/07* (2013.01)

(56) References Cited

FOREIGN PATENT DOCUMENTS

| | | | | |
|---|---|---|---|---|
| CN | 104316027 A | * | 1/2015 | |
| GB | 556379 A | * | 10/1943 | ............... G01C 9/24 |
| WO | WO-2014012301 A1 | * | 1/2014 | ............... G01C 5/00 |
| WO | WO-2018201907 A1 | * | 11/2018 | ........... G01C 15/004 |

* cited by examiner

| FIG. 3A |
| FIG. 3B |

TRAVERSE-TYPE MEASUREMENT METHOD FOR DUAL-SYSTEM BILATERAL-SURVEY COMPOSITE LEVEL

BACKGROUND OF THE INVENTION

1. Field of the Invention

The present invention relates to the field of measurement technologies; in particular, to a traverse-type measurement method for a dual-system bilateral-survey composite level which is specialized to ensure measurement precision, avoid invalid measurements and improve working efficiency.

2. Description of Related Art

A traditional leveling device consists of one level and two leveling staffs. During measurement, the two leveling staffs are separately placed at points A and B on the ground first, and then the level is placed at the middle point between the points A and B. Elevation values of the two leveling staffs are read along the horizontal line of sight of a level telescope after leveling. A difference between the measured elevation values is a level height difference between the points A and B on the ground. If the elevation of one point is known, the elevation of the other point can be figured out according to the height difference. The traditional leveling device mainly has the following defects: (1) The measurement has low working efficiency and reliability. It usually takes a lot of energy and time of measurement personnel to achieve a rational location configuration of three points, i.e., the level and the two leveling staffs, in a complex terrain environment, affecting the measurement efficiency. (2) Measurements are restricted by terrain environments. In complex terrain environments such as steep slopes, hollows, ponds, canals and ditches, gullies, rivers, and mountainous areas, it is generally impossible to set up the level at the middle point between the two leveling staffs, thus failing to implement leveling. In order to overcome the aforementioned defects, Chinese Patent Application No. 201220611636.6 discloses a ruler-instrument integrated composite level for dual-type observation (hereinafter referred to as a composite level), which has the following structure: a leveling staff and an observation unit (that is, the traditional level) that are parallel to the axis of a cylindrical ruler body are fixed on the same cylindrical surface of the cylindrical ruler body. The collimation axis of the observation unit is perpendicular to the axis of the cylindrical ruler body. The measurement method thereof includes the following steps: placing instruments, synchronous leveling, mutual alignment, bilateral survey, bidirectional inspection, and so on. Point-to-point direct leveling can be implemented effectively, and it is unnecessary to spend much time and energy to figure out a rational location and distance configuration of the level and leveling staff, thereby improving the working efficiency and reliability of leveling. Site selection and stationing of leveling are not restricted by terrain environments, so that leveling can be implemented in complex terrain environments such as steep slopes, hollows, ponds, canals and ditches, gullies, rivers, and mountainous areas conveniently. Chinese Patent Application No. 201310049994.1 discloses a leveling method suitable for a compound level, and specifically discloses a method for determining angle i (one of instrument parameters) of a composite level and a method for thoroughly eliminating impact of the angle i. Chinese Patent Application No. 201410585033.7 discloses a composite level own-side height determination method, and specifically discloses a method for precisely determining the height (one of instrument parameters) of an observation unit (that is, a level) and a method for combined determination of the height and angle i, thereby precisely determining the instrument parameters. However, the height difference measurement methods in the aforementioned patents still adopt a traverse-type measurement mode of the traditional leveling in which measurement proceeds through passing-on of two points. The traverse-type measurement mode in which measurement proceeds through passing-on of two composite levels includes the following steps: measuring instrument parameter information, that is, measuring performance parameters of the composite level such as the height and angle i; determining start and end measurement points of a measurement section; and placing instruments and establishing survey stations. A lot of measurement points will be disposed between the start measurement point and the end measurement point of the measurement section, and these measurement points are referred to as transitional measurement points (also known as benchmarks). Starting from the first survey station, two composite levels are separately disposed at a rear measurement point and a front measurement point of the survey station. As shown in FIG. 1 and FIG. 2, for a survey station k, a measurement point $P_k$ is referred to as a rear measurement point and a measurement point $P_{k+1}$ is referred to as a front measurement point. The distance between the rear measurement point and the front measurement point is a survey station distance $D_k$. The survey station distance when the survey station is initially established is referred to as an initial survey station distance, which is denoted by $D_k^0$. The initial survey station distance $D_k^0$ is determined based on the following principle: the initial survey station distance should not be greater than distance tolerance stipulated in national regulations (for fourth-grade measurement, the survey station distance tolerance is 150 m); and it should be ensured that a composite level A and a composite level B are located within height difference observation ranges of instruments (the height difference observation range of current composite levels is 1.5 m). After synchronous observation, an average of measured effective height differences of the two composite levels is calculated as a height difference $h_k$ of the current station. Then, the composite level at the rear measurement point of the current survey station k is moved to the front measurement point of the next survey station (the front measurement point of the previous station becomes the rear measurement point of the next survey station) to continue to measure a height difference of the survey station k+1, and so on, until the measurement proceeds to the last survey station n and the last measurement point $P_{n+1}$ (that is, the end measurement point). The sum of all survey station height differences is calculated as a measurement section height difference of this forward measurement (which is referred to as a forward measurement height difference). Next, height difference measurement is performed by using the same method in a reverse direction starting from the last measurement point $P_{n+1}$ (that is, the original end measurement point), until the measurement proceeds to the original start measurement point. Then, the sum of all survey station height differences is calculated as a measurement section height difference of this reverse measurement (which is referred to as a reverse measurement height difference). In other words, the traverse-type measurement mode in which measurement proceeds through passing-on of two points requires a roundtrip along a traverse for leveling, so that forward and reverse measurements are carried out to implement closed-loop height difference inspection. The biggest problems of this measurement mode are as follows: (1) when the traverse is excessively long, it is often hard to complete the forward and reverse measurements in a limited period of time (such as one day) to form a closed loop, causing existing measurement results to be invalid; (2) before a closed loop along the traverse is completed, it is impossible to determine whether the result is qualified; once the result is determined as unqualified in the height difference inspection after the loop is closed, all finished measurement results become invalid, and this hinders the improvement of the overall leveling efficiency.

In order to solve the foregoing problems in the traverse-type measurement mode in which measurement proceeds through passing-on of two points, Chinese Patent Application No. 201410044122.0 discloses a three-point closed layout measurement method for composite levels, and specifically discloses a three-point closed layout measurement method for composite levels that can realize closed inspection in a regional space at any time, ensure measurement precision, and improve overall leveling reliability and efficiency. This method extends the traditional two-point traverse-type leveling to three-point closed planar leveling, that is, leveling points are arranged in such a manner that connecting lines of every three adjacent leveling points form a triangle and every two adjacent triangles have one or two common leveling points. Then, three composite levels are used to measure height differences between every two of the every three adjacent leveling points sequentially, and regional space closed height difference inspection is performed in the formed closed special region (triangle) to obtain height difference measurement results meeting closure tolerance. Finally, the elevation of a target level point is obtained. Because multiple continuous closed spatial regions are formed in the measurement route, this method can fully meet the requirement of forming a closed loop on the leveling traverse in a limited period of time, and the measurement can begin or stop at any time without affecting the measurement precision, thus avoiding invalidation of the measurement results as a closed loop cannot be formed in a limited period of time and effectively improving the overall measurement working efficiency. However, the three-point closed layout measurement method still has the following problems: (1) instruments and personnel need to be added, and the amount of work is enormous, that is, the method requires high manpower and resource costs; (2) the method has strict requirements on terrain conditions. In other words, unless there is a special need or higher precision and reliability are required in some regions, the three-point closed layout measurement method is not a preferred measurement method for composite levels considering the economic effectiveness, engineering requirement, and practicability for users.

SUMMARY OF THE INVENTION

In order to solve the aforementioned technical problems of the prior art, the present invention provides a traverse-type measurement method for a dual-system bilateral-survey composite level which is specialized to ensure the measurement precision, avoid invalid measurements, and improve working efficiency The present invention adopts the following technical solution: a traverse-type measurement method for a dual-system bilateral-survey composite level, including the following steps:

Step 1: measuring instrument parameter information;

Step 2: determining start and end measurement points of a measurement section, and placing a composite level A at the start measurement point;

Step 3: placing instruments and establishing survey stations;

Step 4: setting an initial number of observations;

Step 5: separately observing readings on the composite level A and a composite level B according to the set number of observations, and separately calculating errors of the readings;

Step 6: determining whether the errors of the readings exceed a limit, where if the errors do not exceed the limit, Step 7 is performed; if any error exceeds the limit, the number of observations is increased and it is determined whether the number of observations exceeds a threshold M; if the number of observations does not exceed M, Step 5 is performed again, and if the number of observations exceeds M, a front measurement point is moved to reduce a survey station distance, and then it is determined whether the survey station distance $D_k$ is less than a threshold $D_0$; if $D_k$ is less than $D_0$, the measurement is ended; otherwise, Step 3 is performed again;

Step 7: calculating an average reading of the composite level A as a survey station height difference $h_k^A$ of the level A; calculating an average reading of the composite level B as a survey station height difference $h_k^B$ of the level B; and calculating a mutual deviation $\delta_{AB}$ between the survey station height differences of the two levels;

Step 8: determining whether $|\delta_{AB}|$ exceeds tolerance $\delta_0$, where if $|\delta_{AB}|$ does not exceed $\delta_0$, Step 9 is performed; and if $|\delta_{AB}|$ exceeds $\delta_0$, the number of observations is increased and then it is determined whether the number of observations exceeds the threshold M; if the number of observations does not exceed M, Step 5 is performed again, and if the number of observations exceeds M, the front measurement point is moved to reduce the survey station distance, and then it is determined whether the survey station distance $D_k$ is less than the threshold $D_0$; if $D_k$ is less than $D_0$, the measurement is ended; otherwise, Step 3 is performed again;

Step 9: calculating an average of the survey station height differences of the two levels as a height difference $h_k$ of the current survey station;

Step 10: calculating a cumulative survey station height difference $H_k^A$ of the composite level A; and calculating a cumulative survey station height difference $H_k^B$ of the composite level B;

Step 11: calculating a difference $\Delta_{AB}$ between the cumulative survey station height differences of the two levels;

Step 12: determining whether $|\Delta_{AB}|$ exceeds tolerance $\Delta_0$, where if $|\Delta_{AB}|$ exceeds $\Delta_0$, the front measurement point is moved to reduce the survey station distance, and then it is determined whether the survey station distance $D_k$ is less than the threshold $D_0$; if $D_k$ is less than $D_0$, the measurement is ended; otherwise, Step 3 is performed again; and if $|\Delta_{AB}|$ does not exceed $\Delta_0$, Step 13 is performed;

Step 13: calculating a sum $H_k$ of all survey station height differences; and

Step 14: determining whether the composite level A is placed at the end measurement point; if not, moving a composite level on a rear measurement point, and performing Step 3 again; if yes, ending the measurement.

The present invention is an intelligent traverse-type measurement method for integrated three-level error control loop inspection with the dual-system bilateral survey compound level. Specifically, survey station single-instrument inspection, survey station dual-instrument cross-inspection, and multi-survey station dual-instrument cumulative cross-inspection are adopted, and the number of observations and distance between survey stations are adjusted, such that measurement error is dynamically controlled in real time, ensuring that height difference measurement of survey stations and of measurement sections meets a preset precision requirement regardless of location or time, avoiding the invalid measurements that frequently occur with traditional levels, and improving working efficiency and economic benefit of the composite level.

DETAILED DESCRIPTION OF THE PREFERRED EMBODIMENTS

Figure 1:
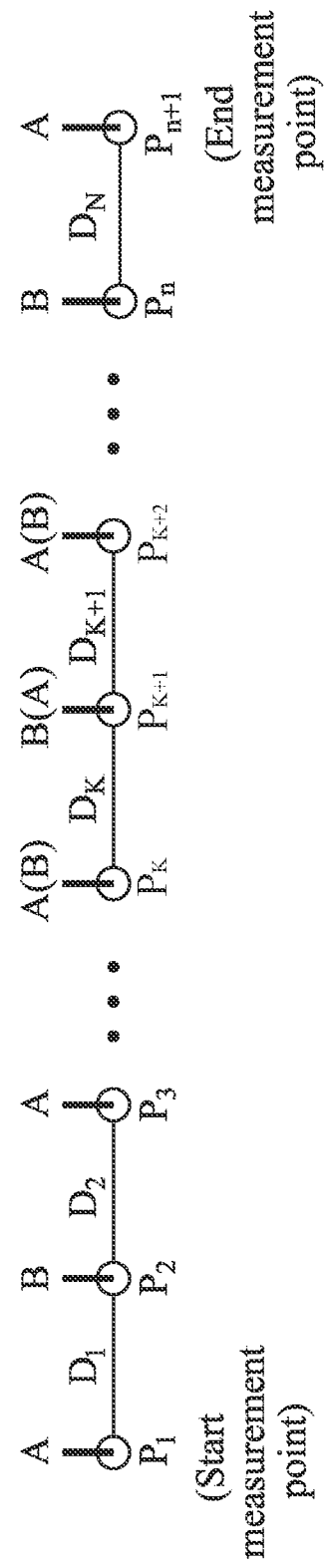
FIG. 1 is a schematic diagram of arrangement of measurement sections and survey stations according to an embodiment of the present invention.
Figure 2:
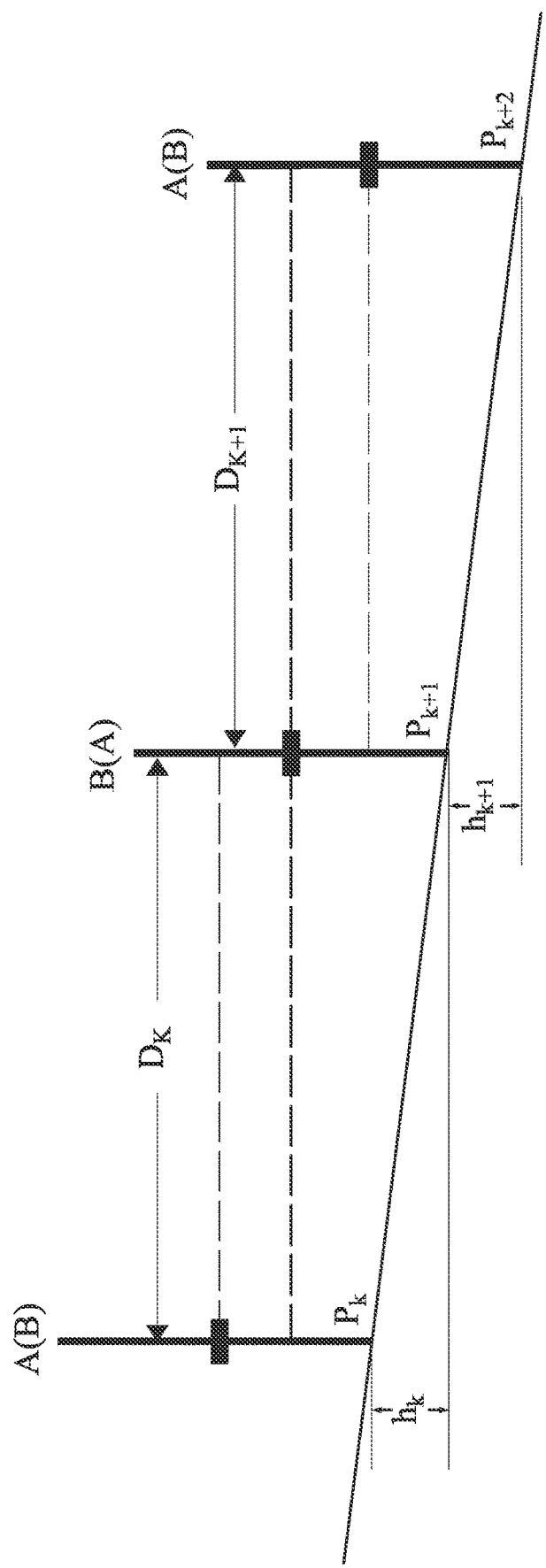
FIG. 2 is a schematic diagram of measurement point placement of composite levels A and B according to an embodiment of the present invention.
Figures 3, 3A:
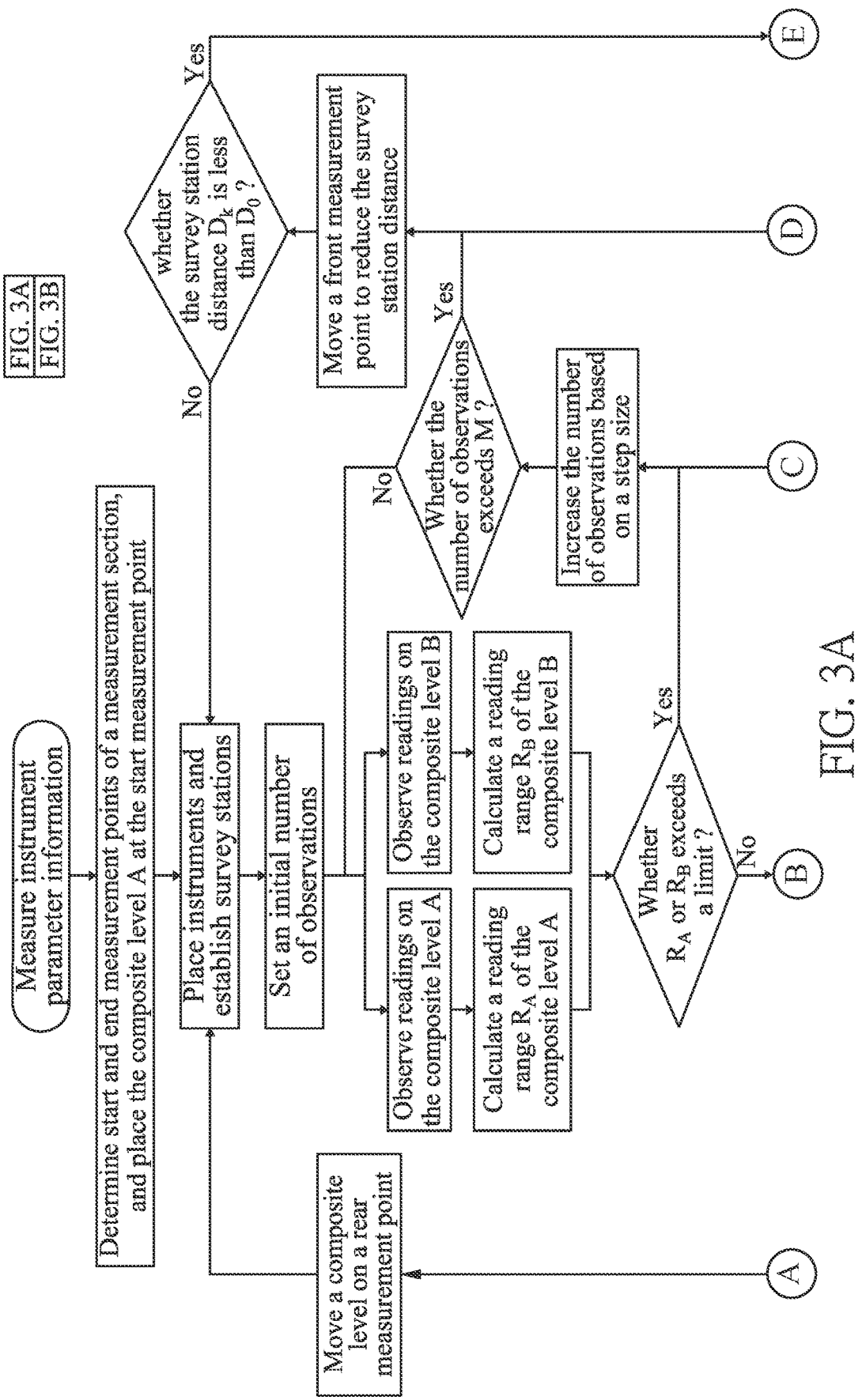
FIG. 3 (FIG. 3A and FIG. 3B) is a flowchart of an embodiment of the present invention.
Figure 3B:
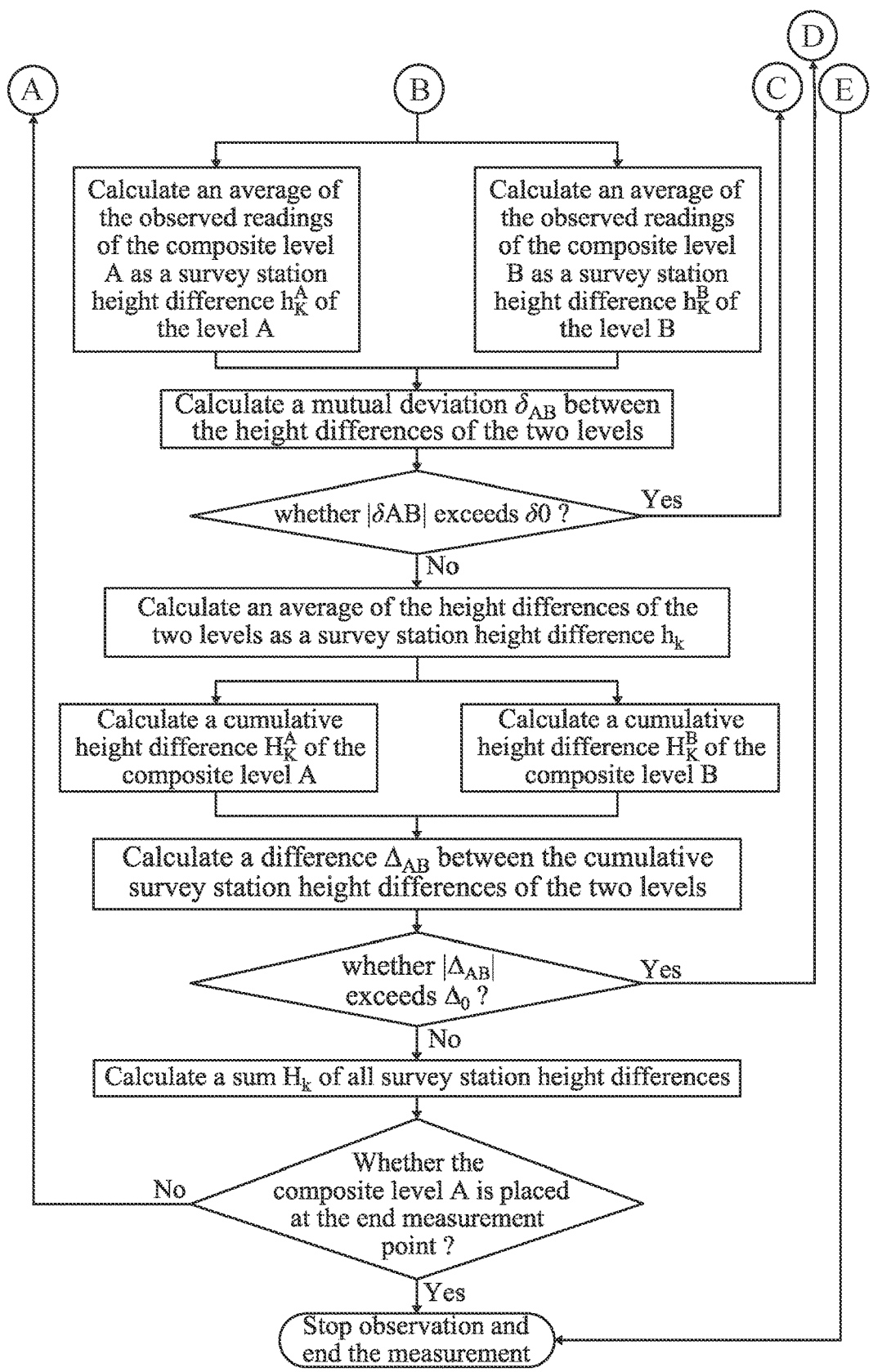

As shown in FIG. 1, FIG. 2 and FIG. 3 (FIG. 3A and FIG. 3B), the traverse-type measurement method for a dual-system bilateral-survey composite level according to the present invention includes the following steps:

Step 1: Measure instrument parameter information. That is, performance parameters of a composite level A and a composite level B, such as the height and angle i of the composite levels, are measured according to the existing technology. The performance parameters should meet design requirements of the composite levels.

Step 2: Determine start and end measurement points of a measurement section, and place the composite level A at the start measurement point, as shown in FIG. 1.

Step 3: Place instruments and establish survey stations. That is, the composite level A and the composite level B are placed at adjacent measurement points for synchronous observation, i.e., the two composite levels form a survey station. For establishment of the first survey station, it is only necessary to place the composite level B at an adjacent measurement point because the composite level A is already placed at the start measurement point in Step 2. Establishment of the $k^{th}$ survey station is as shown in FIG. 2. Synchronous leveling and scale cross reference are carried out after the instruments are placed.

Step 4: Set an initial number of observations to 5.

Step 5: Observe readings on the composite level A according to the set number of observations (an observed reading refers to a value obtained by correcting a collimated reading of a composite level observation unit according to the instrument parameter information such as the angle i and instrument height based on the existing technology), and calculate a range $R_A$ (maximum observed reading-minimum observed reading) of the observed readings; observe readings on the composite level B according to the set number of observations, and calculate a range $R_B$ of the readings; alternatively, separately calculate standard deviations $\sigma_A$ and $\sigma_B$ of the observed readings, where the standard deviations $\sigma_A$ and $\sigma_B$ of the observed readings can be calculated according to a formula in the existing technology.

Step 6: Determine whether errors of the readings exceed a limit

It is determined whether the ranges $R_A$ and $R_B$ of the observed readings exceed a limit, that is, whether $|R_A| \leq R_0$ and $|R_B| \leq R_0$. In this embodiment, $R_0 = 6$ mm. $R_0$ can be derived according to national leveling grade requirements or obtained based on numerous practice statistics. It is also feasible to determine whether the standard deviations exceed a limit, that is, whether $|\sigma_A| \leq \sigma_0$ and $|\sigma_B| \leq \sigma_0$. In this embodiment, $\sigma_0 = 1.5$ mm. $\sigma_0$ can be directly given according to the national leveling grade requirements or obtained based on numerous practice statistics.

If the errors do not exceed the limit, Step 7 is performed.

If any error exceeds the limit, the number of observations is increased (the number can be increased by 1 each time or increased based on a particular step size), and it is determined whether the number of observations exceeds a threshold M (M is set to 30 in this embodiment); if the number of observations does not exceed M, Step 5 is performed again, and if the number of observations exceeds M, a front measurement point is moved to reduce a survey station distance, and then it is determined whether the survey station distance $D_k$ is less than a threshold $D_0$. The threshold $D_0$ can be directly given based on a particular ratio according to distance requirements of the national leveling grades or obtained based on numerous practice statistics. In this embodiment, $D_0 = \frac{1}{3} D_k^0$, and corresponding to fourth-grade leveling, $D_k^0 = 150$ mm and $D_0 = 50$ m. If $D_k$ is less than $D_0$, it indicates a poor measurement condition (which is generally caused by high winds). If the observation distance is decreased excessively, it results in low measurement efficiency, and the measurement should be ended directly. If $D_k$ is not less than $D_0$, Step 3 is performed again.

It should be noted that Step 1 to Step 6 above form a first-level error control loop.

Step 7: Calculate an average reading of the composite level A as a survey station height difference $h_k^A$ of the level A; calculate an average reading of the composite level B as a survey station height difference $h_k^B$ of the level B; and calculate a mutual deviation $\delta_{AB}$ between the survey station height differences of the two levels, where $\delta_{AB} = h_k^A - h_k^B$.

Step 8: Determine whether $|\delta_{AB}|$ exceeds tolerance $\delta_0$. The tolerance $\delta_0$ can be directly given according to the national leveling grade requirements or obtained based on numerous practice statistics. In this embodiment, $\delta_0 = 5$ mm.

If $|\delta_{AB}|$ does not exceed $\delta_0$, Step 9 is performed;

If $|\delta_{AB}|$ exceeds $\delta_0$, the number of observations is increased as in Step 6, and then it is determined whether the number of observations exceeds the threshold M; if the number of observations does not exceed M, Step 5 is performed again, and if the number of observations exceeds M, the front measurement point is moved to reduce the survey station distance, and then it is determined whether the survey station distance $D_k$ is less than the threshold $D_0$; if $D_k$ is less than $D_0$, the measurement is ended; otherwise, Step 3 is performed again.

Step 9: Calculate a height difference $h_k$ of the current survey station, that is, calculate an average $h_k$ of the survey station height differences $h_k^A$ and $h_k^B$ of the two levels as a height difference result of the current survey station k, wherein $h_k = \frac{1}{2}(h_k^A + h_k^B)$.

It should be noted that Step 7 to Step 9 above form a second-level error control loop.

Step 10: Calculate a cumulative survey station height difference $H_k^A$ of the composite level A; and calculate a cumulative survey station height difference $H_k^B$ of the composite level B; that is, separately calculate cumulative height differences of the composite level A and the composite level B from the first survey station to the current survey station k:

$$H_k^A = \sum_{i=1}^{k} h_i^A$$

$$H_k^B = \sum_{i=1}^{k} h_i^B$$

Step 11: Calculate a difference $\Delta_{AB}$ between the cumulative survey station height differences of the two levels.

Step 12: Determine whether $|\Delta_{AB}|$ exceeds tolerance $\Delta_0$. The tolerance $\Delta_0$ can be directly given according to the national leveling grade requirements or obtained based on numerous practice statistics. In this embodiment, $\Delta_0=14 \sqrt{L_{mm}}$ (L is a cumulative survey station distance, that is, $L=\Sigma_{i=1}^{k} D_i$).

If $|\Delta_{AB}|$ exceeds $\Delta_0$, the front measurement point is moved to reduce the survey station distance, and then it is determined whether the survey station distance $D_k$ is less than the threshold $D_0$; if $D_k$ is less than $D_0$, the measurement is ended; otherwise, Step 3 is performed again.

If $|\Delta_{AB}|$ does not exceed $\Delta_0$, Step 13 is performed.

Step 13: Calculate a sum $H_k$ of all survey station height differences.

$$H_k = \sum_{i=1}^{k} h_i$$

Step 14: Determine whether the composite level A is placed at the end measurement point; if no, that is, if the composite level A has not arrived at the end measurement point yet, move a composite level on a rear measurement point of the current survey station k, and perform Step 3 again (place the moved composite level to a front measurement point of the next survey station to establish a new survey station); if yes, end the measurement.

During establishment of measurement sections and survey stations, the composite level A (or the composite level B) is moved from the first measurement point (that is, the start measurement point) to the last measurement point (that is, the end measurement point) to ensure that the total number n+1 of measurement points (including the start measurement point and the end measurement point) is an odd number, and the total number n of survey stations is an even number, thereby further ensuring the precision of height difference measurement.

It should be noted that Step 10 to Step 13 above form a third-level error control loop.

It can be known from the embodiment that only the following two situations can occur during implementation of the present invention: (1) if measurement is permitted, a qualified result will be obtained through measurement; (2) if the measurement condition is too poor to carry out measurement, the current measurement is given up directly, thereby effectively avoiding invalid measurements that occur in the traditional traverse-type measurement mode, and effectively improving working efficiency of leveling.

What is claimed is:

1. A traverse-type measurement method for a dual-system bilateral-survey composite level, comprising the following steps:
   Step 1: measuring instrument parameter information;
   Step 2: determining start and end measurement points of a measurement section, and placing a composite level A at the start measurement point;
   Step 3: placing instruments and establishing survey stations;
   Step 4: setting an initial number of observations and setting k=1, wherein k is a current survey station setup stage number;
   Step 5: separately observing readings on the composite level A and a composite level B according to the set number of observations, and separately calculating errors of the readings;
   Step 6: determining whether the errors of the readings exceed a limit,
   wherein if the errors do not exceed the limit, Step 7 is performed; if any error exceeds the limit, the number of observations is increased and it is determined whether the number of observations exceeds a threshold M; if the number of observations does not exceed M, Step 5 is performed again, and if the number of observations exceeds M, a front measurement point is moved to reduce a survey station distance, and then it is determined whether the survey station distance $D_k$ is less than a threshold $D_0$; if $D_k$ is less than $D_0$, the measurement is ended; otherwise, Step 3 is performed again;
   Step 7: calculating an average reading of the composite level A as a survey station height difference $h_k^A$ of the level A; calculating an average reading of the composite level B as a survey station height difference $h_k^B$ of the level B; and calculating a mutual deviation $\delta_{AB}$ between the survey station height differences of the two levels;
   Step 8: determining whether $|\delta_{AB}|$ exceeds tolerance $\delta_0$, wherein if $|\delta_{AB}|$ does not exceed $\delta_0$, Step 9 is performed; and
   if $|\delta_{AB}|$ exceeds $\delta_0$, the number of observations is increased and then it is determined whether the number of observations exceeds the threshold M; if the number of observations does not exceed M, Step 5 is performed again, and if the number of observations exceeds M, the front measurement point is moved to reduce the survey station distance, and then it is determined whether the survey station distance $D_k$ is less than the threshold $D_0$; if $D_k$ is less than $D_0$, the measurement is ended; otherwise, Step 3 is performed again;
   Step 9: calculating an average of the survey station height differences of the two levels as a height difference $h_k$ of the current survey station;
   Step 10: calculating a cumulative survey station height difference $H_k^A$ of the composite level A; and calculating a cumulative survey station height difference $H_k^B$ of the composite level B;
   Step 11: calculating a difference $\Delta_{AB}$ between the cumulative survey station height differences of the two levels;
   Step 12: determining whether $|\Delta_{AB}|$ exceeds tolerance $\Delta_0$, wherein if $|\Delta_{AB}|$ exceeds $\Delta_0$, the front measurement point is moved to reduce the survey station distance, and then it is determined whether the survey station distance $D_k$ is less than the threshold $D_0$; if $D_k$ is less than $D_0$, the measurement is ended; otherwise, Step 3 is performed again; and if $|\Delta_{AB}|$ does not exceed $\Delta_0$, Step 13 is performed;

Step 13: calculating a sum $H_k$ of all survey station height differences; and

Step 14: determining whether the composite level A is placed at the end measurement point; if not, moving a composite level on a rear measurement point, setting k to be equal to k+1, and performing Step 3 again; if yes, ending the measurement.

\* \* \* \* \*